April 18, 1933.  S. N. BUCHANAN  1,904,617
CABLE CONNECTER
Filed March 18, 1932
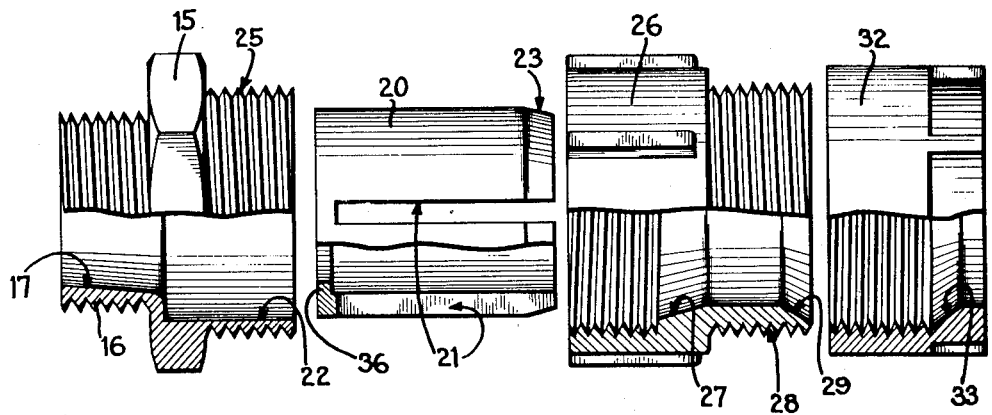
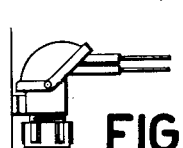
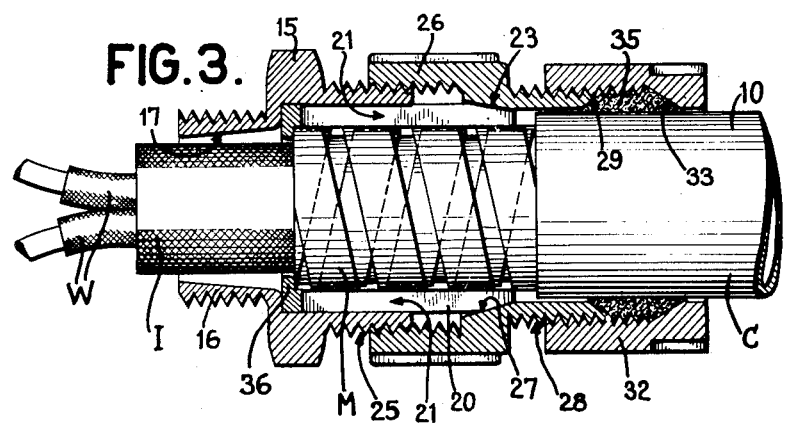
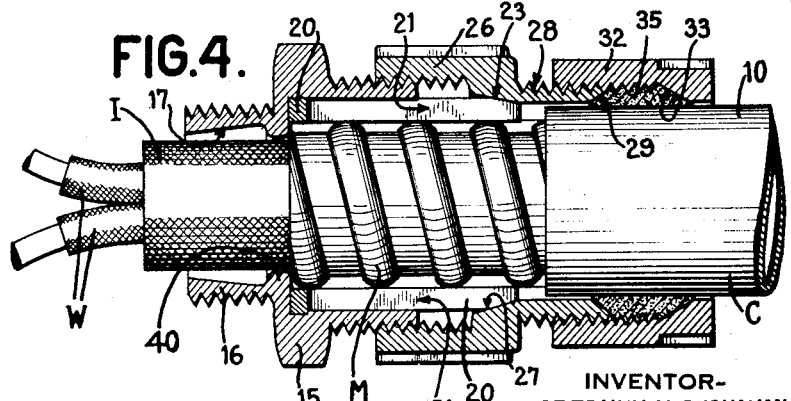
INVENTOR-
STEPHEN N. BUCHANAN
BY
Bohleber & Ledbetter
ATTORNEYS Patented Apr. 18, 1933

1,904,617

UNITED STATES PATENT OFFICE

STEPHEN N. BUCHANAN, OF ELIZABETH, NEW JERSEY

CABLE CONNECTER

Application filed March 18, 1932. Serial No. 599,622.

The invention pertains to a connecter by means of which parkway or trench-lay cable is anchored and grounded in an opening, such as an outlet opening in a box, and a water-tight seal established between the connecter and the cable. The invention also pertains to a wall assembly by which cable constructed similarly to parkway or trench-lay cable is secured within the opening in a wall, such as the wall of an entry box, the armor of the cable is grounded to the wall and a weather-proof or moisture-proof seal established between the cable connecter and the cable.

It is an object of the invention to construct a connecter adapted to be used with cables constructed similarly to trench-lay or parkway cable in which the cable is gripped within the connecter, the armor is electrically grounded to the connecter and a moisture-tight seal established between the connecter and the cable.

Another object of the invention is to construct a wall assembly by means of which an electrical cable having metallic protective armor is anchored within an opening in a wall, the armor is grounded to the wall through the connecter and a weather-proof or moisture-tight seal is made between the connecter and the cable.

Other objects of the invention will be more apparent from the following description, taken in connection with the accompanying drawing showing a preferred embodiment of the invention, in which:

Figure 1 is a plan view of an entry box with a section of parkway cable leading thereto which cable is secured within an opening in the wall of the box by means of a connecter shown in the other figures.

Figure 2 is an exploded view of the cable connecter with portions of the various parts in section to more clearly show the construction thereof.

Figure 3 is a cross-section through an assembled connecter showing the connecter gripping the metallic armor of the cable in which the armor is of the flat or strip type, in order to anchor the cable in the connecter and ground the armor through the connecter.

Figure 4 is a cross-section of a connecter gripping the metallic armor of a cable which armor is of the interlocking form and grounding the armor through the connecter.

Parkway cable is a form of protected cable in which the wires are embedded in insulation and a protecting flexible and metallic armor is wrapped around the insulated wires in order to effectively protect the wires against abrasion. The armor of the cable is in turn coated with insulating material held in place by a woven fabric cover so that the resulting cable is in the neighborhood of an inch to an inch and a quarter in diameter. This type of cable has now been approved for house and building entries, in substitution for insulated wires passing through metallic conduit, and entry connections into an entry box should be moisture or weather-proof since the cable is exposed to the elements. The connecter to be described herein is adapted to perform three functions, namely, to anchor the cable within or at the opening in the wall of an entry box or other structure, ground the metallic armor through the connecter to the entry box or wall, and provide a moisture-proof seal between the cable connecter and the cable. The connecter to be described herein effectively meets all of these conditions.

The connecter, by means of which cable constructed similarly to parkway cable is secured for entry into buildings and houses, is also suitable for securing trench-lay cable in the openings of boxes, for grounding the in the openings of boxes, for grounding the protecting metallic armor with the box, and for forming a water-tight connecter having an effective seal between the connecter and the cable. Trench-lay cable is laid in open trenches and hence subjected to in-seepage of moisture into the boxes if a moisture or weatherproof seal is not made between the connecter and the cable. It is important too that the armor of an armored cable be grounded and the connecter to be described effectively performs the three functions set forth above.

The connecter is shown in Figure 1 anchoring a section of parkway cable 10 in an opening in an entry box 11 which is carried upon the wall of a building 12. The parkway cable 10 is shown paralleling the wall of the building 12 until it is well above the ground level at which point the wires are carried to a distributing pole or point. Since the cable is upon the exterior wall of a building, it is exposed and open to weather and also is in a vertical position. Rain falling upon the cable would flow down the cable and pass between the cable and the connecter into the entry box 11, unless the connecter is so constructed that it is weather-proof. A moisture-tight seal is provided, therefore, between the connecter 13 and the cable 10.

The connecter 13 includes a connecter member 15 having means, such as the threaded nipple 16, for securing the connecter within an opening in a wall, such as the wall of the entry box 11. The connecter member 15 has a passage 17 therethrough to receive the cable and to permit the passage of wires through the connecter into the entry box 11.

The connecter member 15 carries cable clamping means which clamps and anchors the cable within the connecter member. The cable clamping means also establishes an electrical ground between the metallic armor which is wound around the cable and the connecter as will appear more fully hereinafter. The cable clamping means includes a contractile cable clamp 20 which, in its preferred construction, is a sleeve having longitudinal or axial slots 21 which render the end of the cable clamp 20 flexible or contractile. Obviously, any contractile clamp is suitable. The cable clamp 20 is received in a recess 22 in the connecter member 15 and its sleeve form permits the passage of a cable and wires therethrough. The contractile end of the cable clamp 20 projects beyond the end of the connecter member 15. The projecting end of the cable clamp 20 carries preferably a taper 23, the purpose of which will be described hereinafter.

The connecter member 15 is externally threaded at 25 and receives an internally threaded operating member 26. The operating member carries an internal taper 27 corresponding with the taper 23 upon the cable clamp. The operating means 26 has an externally threaded extension 28 and upon the end of the extension is a taper surface 29 against which packing or a packing ring 35 is pressed. A gland nut 32 is internally threaded and received upon the threaded extension 28. The gland nut 32 carries a taper surface 33 therein extending in the opposite direction from the taper 29 upon the end of the extension 28 of the operating means 26. The packing ring 35 is shown clamped in position between the opposed tapering surfaces 29 and 33 and the cable to establish a moisture-tight seal between the connecter and the cable C or particularly between the operating means or member 26 and the cable.

The connecter is shown assembled and gripping the end of a parkway cable C in Figure 3. The outer insulation upon the cable C is shown as being removed upon that section of the cable which is received within the cable clamp or shell 20 in order to expose the metallic armor M lying beneath the outer insulating cover. The contractile cable clamp 20 carries a bushing 36 at its end against which the armor M abuts. The inner insulation I of the cable C within the armor M passes through the bushing and the nipple 16 of the connecter member 15 and the wires W project out of the insulation I.

Upon tightening or threading the operating means or member 26 upon the external threads 25 of the connecter member 15, the internal taper 27 engages the taper 23 upon the end of the cable clamp 20 and contracts the flexible end of the clamp to grip the armor M of the cable C. The cable clamp 20 in gripping the armor also establishes electrical contact therebetween and the connecter so that an electrical ground is established with the entry box 11 through the connecter.

The gland nut 32 is threaded and tightened upon the threaded extension 28 carried by the clamp means 26 to compress the packing 35 between the opposed tapered surfaces 29 and 33 so that the packing is brought into intimate contact with the cable C and forms a moisture-proof seal therebetween. It will be noted that the operating member 26 is externally threaded upon the connecter member 15 so that the operating means forms a water shedding cap for the connecter member 15, particularly when in a vertical position as shown in Figure 1. Water cannot seep upwardly into the connecter member 15 through this capped form of threaded connection.

The connecter shown in Figure 4 is essentially the same as that shown in Figure 3, excepting that the connecter member 15 carries a bushing 40 against which the end of the armor M abuts instead of abutting against a bushing upon the end of the cable clamp 20 as shown in Figure 3. In all other respects the connectors are similarly constructed and hence the construction of connecter shown in Figure 4 will not be further described. The cable clamp of Figure 4 is shown as gripping the interlocking form of metallic armor, thereby showing that the connecter is adapted for cables irrespective of the form of protecting metallic armor used. The armor bushing may be provided upon the cable clamp, as shown in Figure 3, or upon the connecter member, as shown in Figure 4, with either the flat or interlocking form of armor used upon the cable.

The cable connecter described herein includes a connecter member 15 having means to anchor the connecter within an opening in a wall, such as the wall of the entry box 11 shown in Figure 1. The connecter member 15 carries clamping means or a cable clamp 21 and an operating means 26 which contracts the cable clamp to grip the armor M of the cable. The cable clamp therefore not only secures or anchors the cable within the connecter, which in turn anchors the cable within an opening in a wall, but also establishes electrical contact with the metallic armor M of the cable. An electrical ground is established thereby which is carried through the connecter to the wall in which the connecter is secured because of the metal to metal contact between the connecter and the wall. The connecter also carries means for establishing a moisture-tight seal between the connecter and the cable C. This moisture-tight sealing means is carried preferably by the operating means 26 which also operates to contract the cable clamp 21 as described hereinbefore.

It will be noted that the connecter described herein also completes a wall assembly by means of which a cable is secured within an opening in a wall, such as the wall of an inlet box, and the protective metallic armor of the cable is grounded through the connecter to the wall by the cable clamping means gripping and contacting with the metallic armor. The connecter also forms a moisture-tight seal between the connecter and the cable and the connecter is, in addition, so constructed that the seeping in of moisture thereinto is not possible so that a weather-proof wall assembly is provided.

Various modifications will occur to those skilled in the art in the configuration, composition and disposition of the component elements going to make up the invention as a whole, as well as in the selective combination or application of the respective elements, and no limitation is intended by the phraseology of the foregoing description or illustrations in the accompanying drawing, except as indicated in the appended claims.

What is claimed is:

1. A cable connecter comprising a connecter member having a passage therethrough to receive a cable, means carried by the connecter member to anchor the latter in a wall opening, a sleeve having longitudinal slots therein forming flexible arms, the sleeve being carried within the connecter member with the ends of the arms projecting beyond the end thereof, operating means carried upon the exterior of the connecter member, the operating means engaging the projecting ends of the flexible arms to contract the same, an extension upon the operating means having a passage therethrough for the cable, and packing means carried by the extension to seal the space between the latter and the cable.

2. A cable connecter comprising a connecter member having a passage therethrough to receive a cable and with external threads thereon, means carried by the connecter member to anchor the latter in a wall opening, a sleeve having longitudinal slots therein forming flexible arms, the sleeve being carried within the connecter member with the ends of the arms projecting beyond the end thereof, operating means threadedly engaging the threads on the connecter member, an internal taper upon the operating means engaging the projecting ends of the flexible arms to contract the same upon longitudinal movement of the operating means, an extension upon the operating means having a passage therethrough for the cable, and packing means carried by the extension to seal the space between the latter and the operating means.

In testimony whereof I affix my signature.

STEPHEN N. BUCHANAN.